(12) United States Patent
Fultz

(10) Patent No.: US 8,413,610 B1
(45) Date of Patent: Apr. 9, 2013

(54) SELF-CONTAINED PET WASHING SYSTEM

(76) Inventor: Senta Fultz, Taylorsville, KY (US)

( * ) Notice: Subject to any disclaimer, the term of this patent is extended or adjusted under 35 U.S.C. 154(b) by 0 days.

(21) Appl. No.: 13/447,916

(22) Filed: Apr. 16, 2012

(51) Int. Cl.
*A01K 13/00* (2006.01)
(52) U.S. Cl. .................. 119/665; 119/678; 119/671
(58) Field of Classification Search .................. 119/665, 119/673, 678, 71, 653, 7, 754, 755, 756
See application file for complete search history.

(56) References Cited

U.S. PATENT DOCUMENTS

| | | | | |
|---|---|---|---|---|
| 3,807,363 A | * | 4/1974 | Lehman | 119/675 |
| 4,478,176 A | * | 10/1984 | James | 119/669 |
| 5,193,487 A | * | 3/1993 | Vogel | 119/671 |
| 5,213,064 A | * | 5/1993 | Mondine et al. | 119/671 |
| 5,243,931 A | * | 9/1993 | McDonough | 119/671 |
| 5,678,511 A | * | 10/1997 | Day | 119/676 |
| 6,516,752 B2 | * | 2/2003 | Batterton | 119/650 |
| 7,080,608 B1 | * | 7/2006 | Arndt et al. | 119/671 |
| 7,921,812 B1 | * | 4/2011 | Carrillo | 119/604 |

* cited by examiner

*Primary Examiner* — Yvonne Abbott
(74) *Attorney, Agent, or Firm* — Edward P Dutkiewicz

(57) ABSTRACT

A self-contained pet washing system comprises a tub of a generally rectangular configuration. The tub has a plurality of legs, a front wall, a back wall, a first side, a second side, and a bottom. A track is also provided. The track runs along an entire lower extent of the front wall. Further provided is a basket. The basket is coupled to the track. The basket is adapted to store various cleaning devices and supplies. Lastly provided is an inclined ramp for entrance of a pet to a location between the walls.

8 Claims, 4 Drawing Sheets

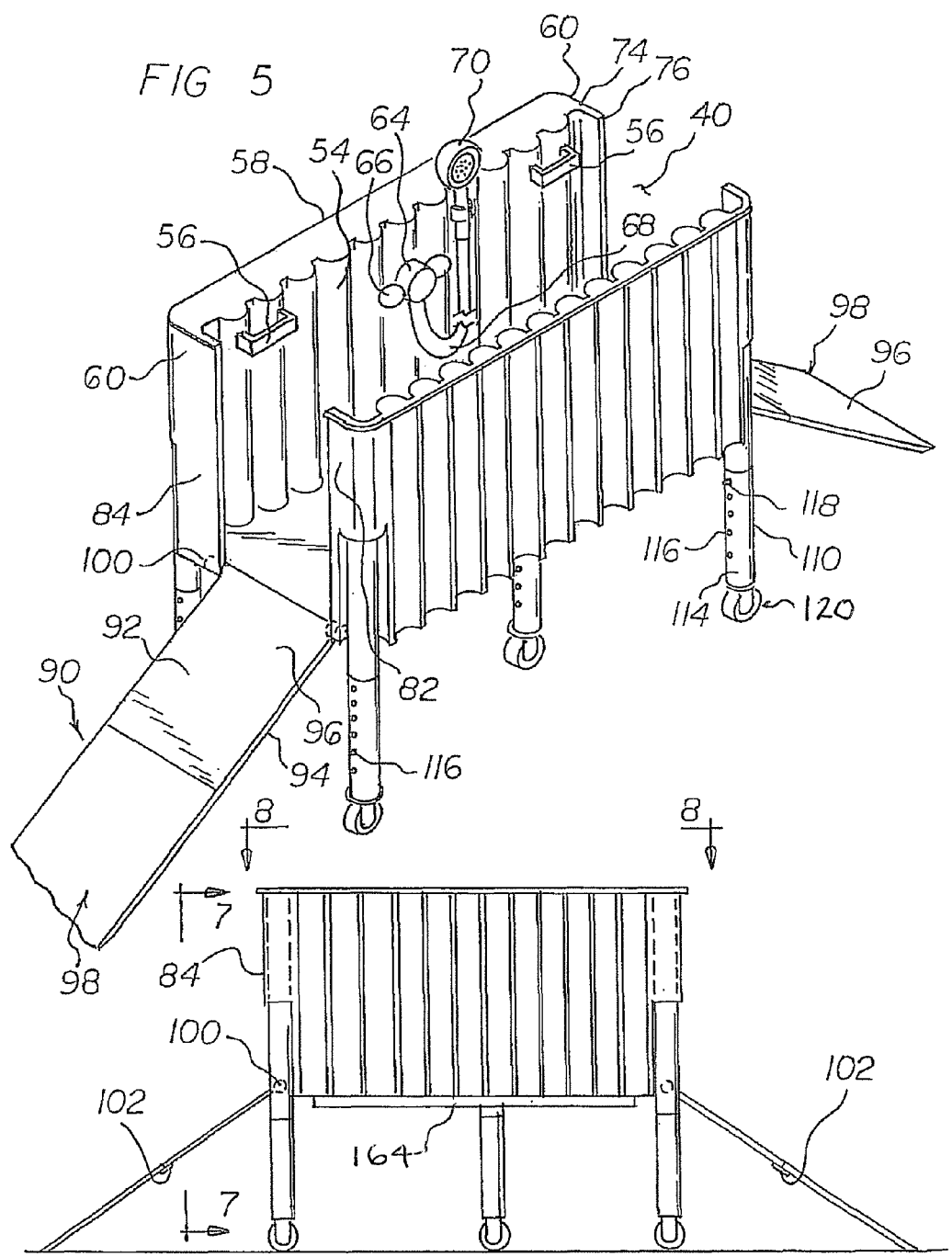

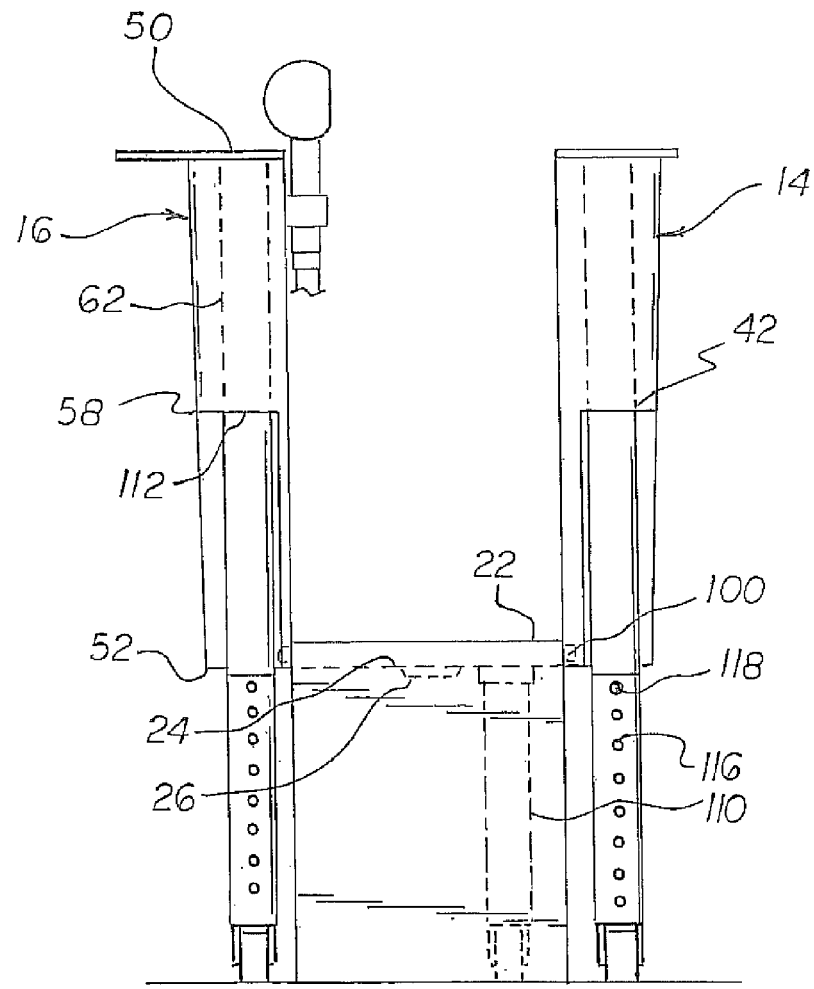
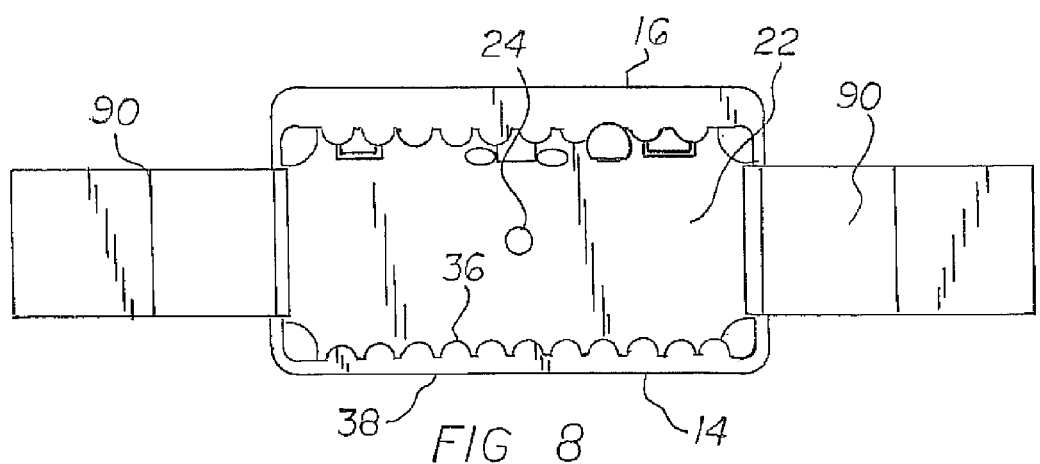

SELF-CONTAINED PET WASHING SYSTEM

BACKGROUND OF THE INVENTION

1. Rule 1.78(F)(1) Disclosure

The Applicant has not submitted a related pending or patented non-provisional application within two months of the filing date of this present application. The invention is made by a single inventor, so there are no other inventors to be disclosed. This application is not under assignment to any other person or entity at this time.

2. Field of the Invention

The present invention relates to a dog washing station and more particularly pertains to a device used for washing a pet.

3. Description of the Prior Art

The use of pet care devices is known in the prior art. More specifically, pet care devices previously devised and utilized for the purpose of the washing of the pet are known to consist basically of familiar, expected, and obvious structural configurations, notwithstanding the myriad of designs encompassed by the crowded prior art which has been developed for the fulfillment of countless objectives and requirements.

While the prior art devices fulfill their respective, particular objectives and requirements, the prior art does not describe dog washing station that allows a use to easily and conveniently wash a pet.

In this respect, the dog washing station according to the present invention substantially departs from the conventional concepts and designs of the prior art, and in doing so provides an apparatus primarily developed for the purpose of a device used for washing a pet.

Therefore, it can be appreciated that there exists a continuing need for a new and improved dog washing station which can be used for washing a pet. In this regard, the present invention substantially fulfills this need.

SUMMARY OF THE INVENTION

In view of the foregoing disadvantages inherent in the known types of pet care devices now present in the prior art, the present invention provides an improved dog washing station. As such, the general purpose of the present invention, which will be described subsequently in greater detail, is to provide a new and improved dog washing station which has all the advantages of the prior art and none of the disadvantages.

To attain this, the present invention essentially comprises a dog washing station, comprising several components in combination.

First provided is a tub. The tub has a front face, a rear face, a right side face, and a left side face. The tub includes a bottom, with the bottom having a drain opening along with an associated drain and drain pipe. The tub also has and an open top.

The tub is fabricated of a rigid material, such as plastic or metal. The front face of the tub has a generally planar rectilinear configuration with an upper edge, a lower edge, an inside surface, and an outside surface. The tub has two opposing side edges, with the front face side edges each having a leg height adjustment recess therein. The front face of the tub has a pair of movable storage drawers.

The rear face of the tub has a generally planar rectilinear configuration with an upper edge, a lower edge, an inside surface having a pair of handles attached there to, and an outside surface. The tub also has two opposing side edges, with the rear face side edges each having a leg height adjustment recess therein. The rear face of the tub has a water source hole there through. The water source hole has an associated faucet, shower hose, and shower head.

The right side face has a forward lip and a rearward lip. The right side forward lip and the right side rearward lip each have a flange stop, with the right side forward lip flange stop and right side rearward lip flange stop lying in a common plane.

The left side face has a forward lip and a rearward lip. The left side forward lip and the left side rearward lip each have a flange stop, with the left side forward lip flange stop and left side rearward lip flange stop lying in a common plane.

The tub right side and the tub left side each have a similarly configured door ramp. The door ramps each have an upper surface and a lower surface, with a thickness there between. Each door ramp has a pivoting side and a ground side. The pivoting sides each have an associated pair of pivot pins. The pivot pins of each of the door ramps couple each of the door ramps to the tub sides.

Each door ramp has a generally centrally located hinging point.

There are four legs. Each of the four legs has a generally tubular configuration, with each leg having an upper end, a lower end, and a length there between. The length of each of the legs has a plurality of height adjustment holes there through. Each leg has a height adjusting pin associated there with. Each of the four legs has a wheel coupled to the lower end of the leg. Each wheel is a caster wheel. The caster wheels each are pivotable about the end of each of the legs. Each of the four legs has an external diameter sized to be mated with and received by each of the leg height adjustment recesses of the tub sides.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved dog washing station which has all of the advantages of the prior art pet care devices and none of the disadvantages.

It is another object of the present invention to provide a new and improved dog washing station which may be easily and efficiently manufactured and marketed.

It is further object of the present invention to provide a new and improved dog washing station which is of durable and reliable constructions.

An even further object of the present invention is to provide a new and improved dog washing station which is susceptible of a low cost of manufacture with regard to both materials and labor, and which accordingly is then susceptible of low prices of sale to the consuming public, thereby making such dog washing station economically available to the buying public.

Even still another object of the present invention is to provide a dog washing station to be used for washing a pet.

Lastly, it is an object of the present invention to provide a new and improved dog washing station comprising a tub having a front face, a rear face, a right side face, and a left side face. The tub including a bottom with a drain opening and an associated drain and drain pipe, the tub also having and an open top. The tub has four legs coupled there to. A pair of folding ramps are pivotably attached to the tub. The ramps double function as ramps and doors to enclose the tub.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a top perspective view showing the handle located on the rear wall of the station, as well as the ramps in the deployed down position. The ramps fold about the hinge and form a pair of doors to enclose the tub area of the station. The interior of the station has a rounded convex corrugated surface to provide rigidity.

FIG. 6 is a side elevational view of the rear face of the dog washing station. The exterior of the rear wall of the station has a generally concave corrugated surface, also to provide rigidity of the wall.

FIG. 7 is a side elevational view of the station with the adjustable leg recesses shown in phantom.

FIG. 8 is a top plan view of the station, with the ramps deployed.

The same reference numerals refer to the same parts throughout the various Figures.

DESCRIPTION OF THE PREFERRED EMBODIMENT

Figure 1:
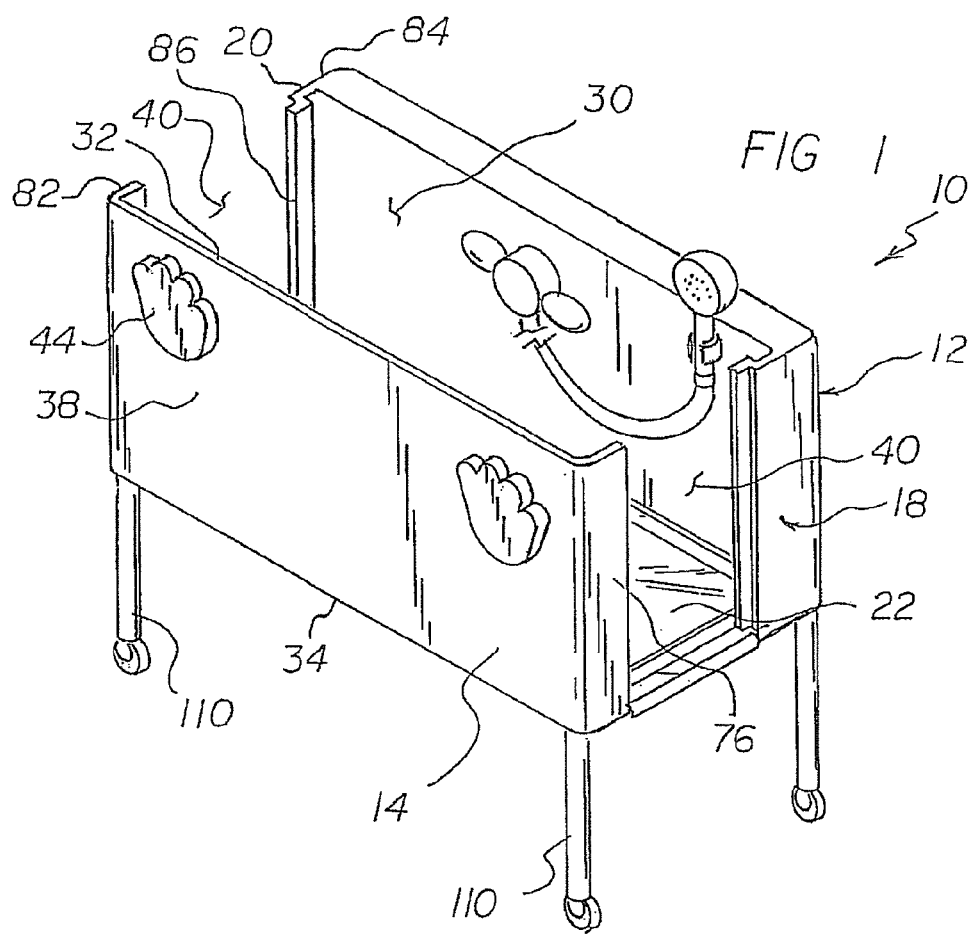
FIG. 1 is a top perspective view of the dog washing station.
Figure 2:
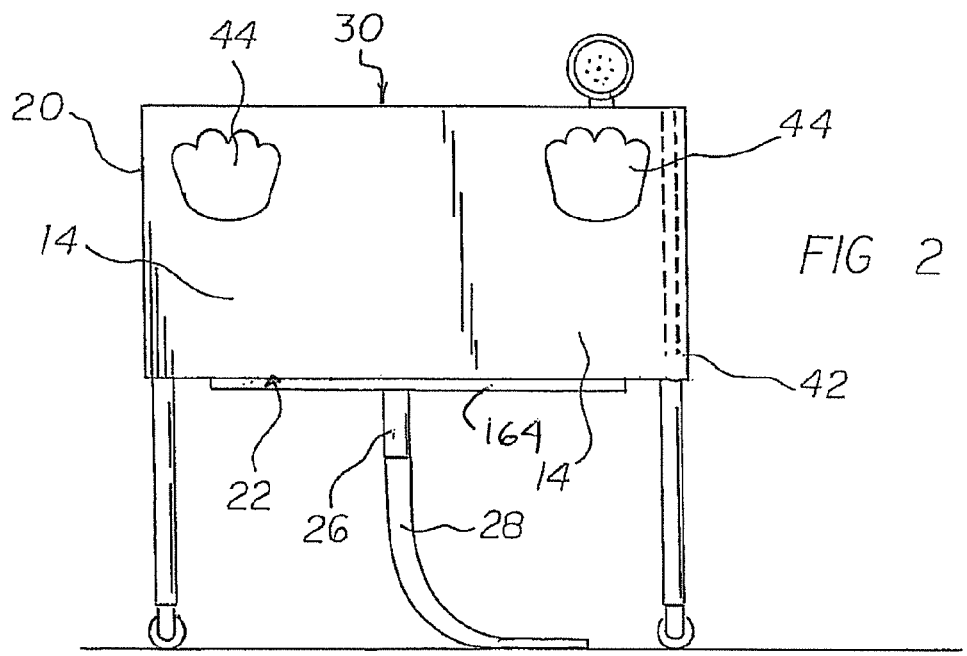
FIG. 2 is a side elevational view of the dog washing station, with the orientation being a view of the front of the dog washing station.
Figure 3:
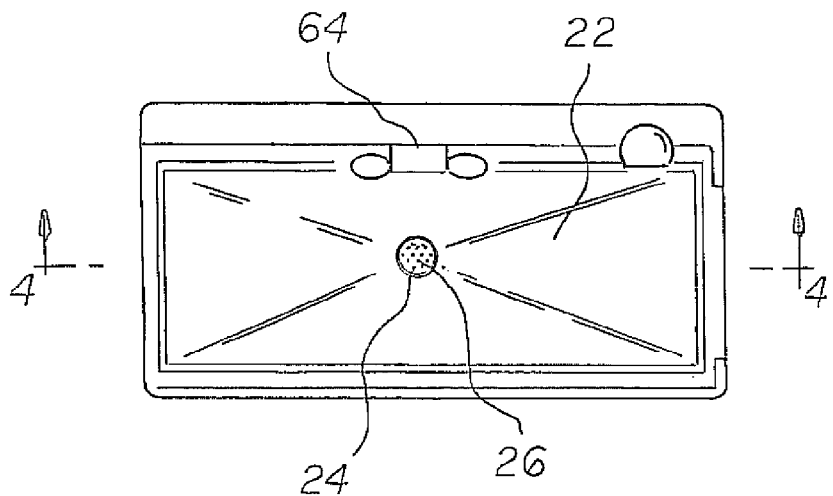
FIG. 3 is a top plan view of the dog washing station.
Figure 4:
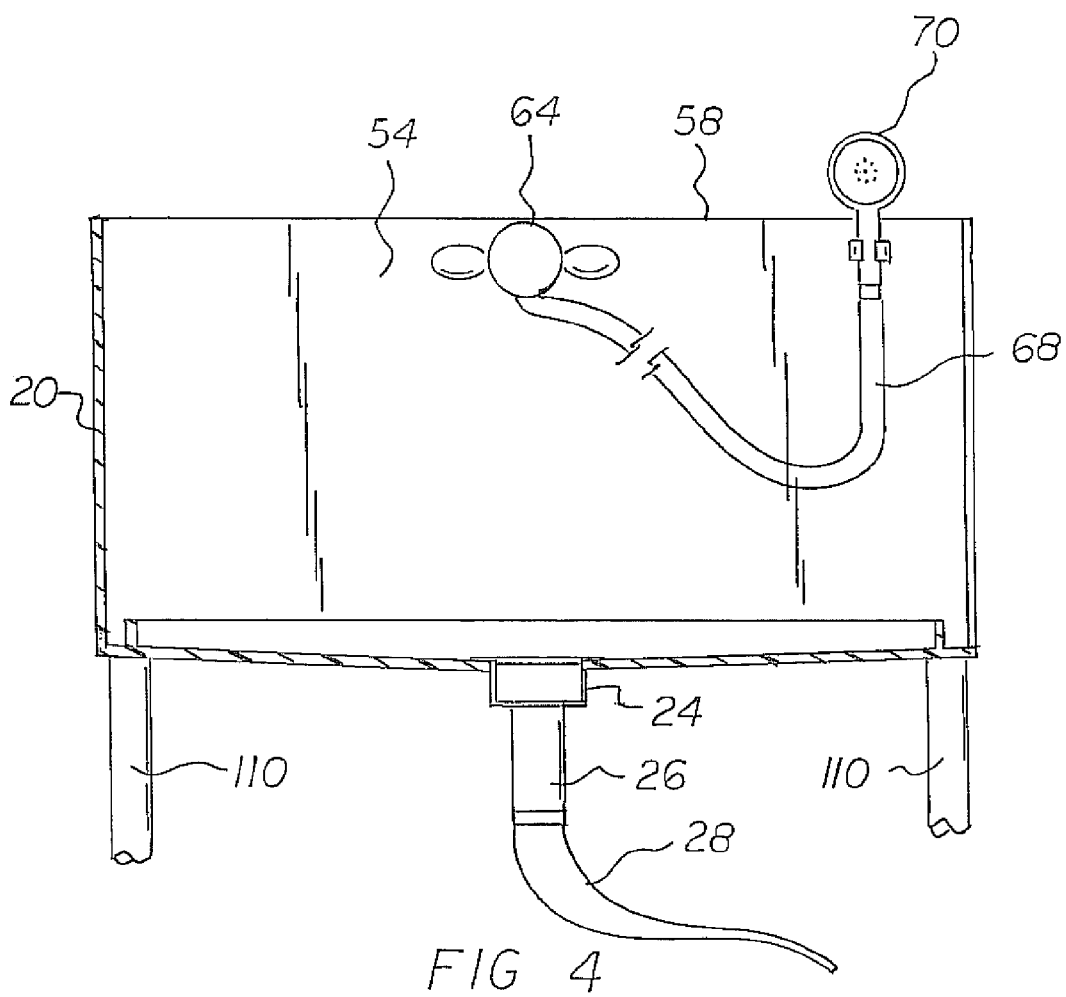
FIG. 4 is a view taken along line 4-4 of FIG. 3.

With reference now to the drawings, and in particular to FIG. 1 thereof, the preferred embodiment of the new and improved dog washing station embodying the principles and concepts of the present invention and generally designated by the reference numeral 10 will be described.

The present invention, the dog washing station 10 is comprised of a plurality of components. Such components in their broadest context include a tub, a faucet and mixing valves for water temperature control, a shower head and a pair of ramps which also fold to form doors to enclose the tub area. Such components are individually configured and correlated with respect to each other so as to attain the desired objective.

First provided is a tub 12. The tub has a front face 14, a rear face 16, a right side face 18, and a left side face 20. The tub includes a bottom 22, with the bottom having a drain opening 24 along with an associated drain 26 and drain pipe 28. The tub also has and an open top 30.

The tub is fabricated of a rigid material, such as plastic or metal. The front face of the tub has a generally planar rectilinear configuration with an upper edge 32, a lower edge 34, an inside surface 36, and an outside surface 38. The tub has two opposing side edges 40, with the front face side edges each having a leg height adjustment recess 42 therein. The front face of the tub has a pair of movable storage drawers 44.

The rear face of the tub has a generally planar rectilinear configuration with an upper edge 50, a lower edge 52, an inside surface 54 having a pair of handles 56 attached there to, and an outside surface 58. The tub also has two opposing side edges 60, with the rear face side edges each having a leg height adjustment recess 62 therein. The rear face of the tub has a water source hole 64 there through. The water source hole has an associated faucet 66, shower hose 68, and shower head 70.

The right side face has a forward lip 72 and a rearward lip 74. The right side forward lip and the right side rearward lip each have a flange stop 76, with the right side forward lip flange stop and right side rearward lip flange stop lying in a common plane.

The left side face has a forward lip 82 and a rearward lip 84. The left side forward lip and the left side rearward lip each have a flange stop 86, with the left side forward lip flange stop and left side rearward lip flange stop lying in a common plane.

The tub right side and the tub left side each have a similarly configured door ramp 90. The door ramps each have an upper surface 92 and a lower surface 94, with a thickness there between. Each door ramp has a pivoting side 96 and a ground side 98. The pivoting sides each have an associated pair of pivot pins 100. The pivot pins of each of the door ramps couple each of the door ramps to the tub sides.

Each door ramp has a generally centrally located hinging point 102.

There are four legs 110. Each of the four legs has a generally tubular configuration, with each leg having an upper end 112, a lower end 114, and a length there between. The length of each of the legs has a plurality of height adjustment holes 116 there through. Each leg has a height adjusting pin 118 associated there with. Each of the four legs has a wheel 120 coupled to the lower end of the leg. Each wheel is a caster wheel. The caster wheels each are pivotable about the end of each of the legs. Each of the four legs has an external diameter sized to be mated with and received by each of the leg height adjustment recesses of the tub sides.

Further provided is a track 164. The track runs along an entire lower extent of the front wall. A basket (not shown) may be slidably coupled to the track. The basket is able to slide along the distance of the track. The basket is further adapted to store various cleaning devices and supplied for the convenience of the user.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A self contained pet washing system for washing pets of a wide variety of sizes in an efficient and neat manner comprising, in combination;
    a tub of a generally rectangular configuration having a front wall, a back wall, a first side, a second side, and a bottom, the tub further having four legs raising the tub to a height convenient to a user, the bottom having a recessed central portion leading to a drain which further leads to a pipe from the tub to a sewage pipe, the drain having a grate to catch loose hair for preventing the clogging of the drain, the back wall having an upper portion with a raised faucet being connected to both a hot water pipe and a cold water pipe and having appropriate valve controls, the first and second sides each having a large aperture to allow the pet to enter the tub;
    a sprayer coupled with respect to the upper portion of the back wall of the tub and having a flexible tube to allow the user to spray a pet in the tub from all sides;
    a handle coupled to the upper portion of the back wall of the tub and extending over the tub, the handle being adapted to hook to a collar of a pet in the tub to prevent the pet from leaving from the tub;
    a track running along an entire lower extent of the front wall with a basket slidably coupled to the track, the basket being able to slide along the distance of the track, the basket further being adapted to store various cleaning devices and supplies for the convenience of the user;
    a first set of stairs coupled to the first side of the tub and leading up to the aperture in the first side of the tub enabling the pet to safely enter and leave the tub, the first set of stairs including hinges, the stairs being pivotable between a lowered position for the entrance or exit of a pet and a raised position for closing the first side of the tub; and
    a second set of stairs coupled to the second side of the tub and leading up to the aperture in the second side of the tub enabling the pet to safely enter and leave the tub, the second set of stairs including hinges, the stairs being pivotable between a lowered position for the entrance or exit of a pet and a raised position for closing the second side of the tub.

2. A self-contained pet washing system comprising:
    a tub of a generally rectangular configuration having four legs, a front wall, a back wall, a first side, a second side, and a bottom;
    a track running along an entire lower extent of the front wall; and
    an inclined walkway for movement of a pet to a location between the walls.

3. The system as set forth in claim 2 and further including a recessed central portion in the bottom leading to a drain.

4. The system as set forth in claim 2 and further including a sprayer coupled with respect to the upper portion of the back wall of the tub and having a flexible tube to allow the user to spray a pet in the tub from all sides.

5. The system as set forth in claim 2 and further including a handle coupled to an upper portion of the back wall of the tub and extending over the tub, the handle being adapted to hook to a collar of a pet in the tub to prevent the pet from escaping from the tub.

6. The system as set forth in claim 2 wherein the first side of the tub is closed and further including an inclined walkway coupled to the first side of the tub leading up to the first side of the tub enabling a pet to safely enter and leave the tub.

7. The system as set forth in claim 2 and further including an inclined walkway coupled to the first side of the tub leading up to the first side of the tub enabling a pet to safely enter the tub and an additional inclined walkway coupled to the second side of the tub leading down from the second side of the tub enabling a pet to safely leave the tub.

8. A self contained pet washing system for washing pets of a wide variety of sizes in an efficient and neat manner comprising, in combination;
    a tub of a generally rectangular configuration having a front wall, a back wall, a first side, a second side, and a bottom, the tub further having a plurality legs raising the tub to a height convenient to a user, the bottom having a recessed central portion leading to a drain, the drain having a grate to catch loose hair for preventing the clogging of the drain, the back wall having an upper portion with a raised faucet being connected to both a hot water pipe and a cold water pipe and having appropriate valve controls, the first and second sides each having a large aperture to allow the pet to enter the tub;
    a sprayer coupled with respect to the upper portion of the back wall of the tub and having a flexible tube to allow the user to spray a pet in the tub from all sides;
    a handle coupled to the upper portion of the back wall of the tub and extending over the tub, the handle being adapted to hook to a collar of a pet in the tub to prevent the pet from leaving from the tub;
    a track running along an entire lower extent of the front wall with a basket slidably coupled to the track, the basket being able to slide along the distance of the track, the basket further being adapted to store various cleaning devices and supplies for the convenience of the user;
    a first ramp coupled to the first side of the tub and leading up to the aperture in the first side of the tub enabling the pet to safely enter the tub, the first ramp including hinges, the stairs being pivotable between a lowered position for the entrance of a pet and a raised position for closing the first side of the tub; and
    a second ramp coupled to the second side of the tub and leading down from the aperture in the second side of the tub enabling the pet to safely leave the tub, the second ramp including hinges, the stairs being pivotable between a lowered position for the exit of a pet and a raised position for closing the second side of the tub.

* * * * *